United States Patent
Cai et al.

(10) Patent No.: US 7,290,322 B2
(45) Date of Patent: Nov. 6, 2007

(54) METHOD OF CRIMPING A RING SHAPED STOP WITHIN AN ANNULAR GROOVE OF A STABILIZER BAR

(75) Inventors: Haimian Cai, Ann Arbor, MI (US); Xinjian Fan, Novi, MI (US); Mikhal el Arculli, Canton, MI (US)

(73) Assignee: Automotive Components Holdings, LLC, Dearborn, MI (US)

( * ) Notice: Subject to any disclaimer, the term of this patent is extended or adjusted under 35 U.S.C. 154(b) by 451 days.

(21) Appl. No.: 10/931,824

(22) Filed: Sep. 1, 2004

(65) Prior Publication Data

US 2006/0043692 A1    Mar. 2, 2006

(51) Int. Cl.
*B21D 39/00* (2006.01)
(52) U.S. Cl. .............. 29/516; 29/505; 29/506; 29/509; 29/510; 403/274; 267/140
(58) Field of Classification Search .......... 29/505, 29/508, 509, 510, 516, 517, 520; 403/274, 403/282, 341; 280/124.106, 124.107, 124.121, 280/124.152; 267/140, 141.6, 141.7, 188, 267/273

See application file for complete search history.

(56) References Cited

U.S. PATENT DOCUMENTS

| | | | |
|---|---|---|---|
| 471,129 A | 3/1892 | Loveland et al. | |
| 1,823,158 A | 9/1931 | Mogford et al. | |
| 2,283,918 A | 5/1942 | Dekome | |
| 2,596,885 A | 5/1952 | Booth | |
| 3,239,930 A | 3/1966 | Violleau | |
| 3,371,572 A | 3/1968 | King, Jr. | |
| 3,633,951 A | 1/1972 | Hinkle et al. | |
| 3,792,603 A | 2/1974 | Orain | |
| 3,916,517 A | 11/1975 | Luongo | |
| 4,138,141 A | 2/1979 | Anderson | |
| 4,231,555 A | 11/1980 | Saito | |
| 4,763,922 A | 8/1988 | Nishikawa | |
| 4,909,638 A | 3/1990 | Muto | |
| 5,000,611 A | 3/1991 | Reinhart | |
| 5,064,216 A * | 11/1991 | Hynds | 280/124.152 |
| 5,084,963 A | 2/1992 | Murray et al. | |
| 5,449,333 A * | 9/1995 | Carter | 482/109 |
| 5,606,790 A | 3/1997 | Laue | |
| 5,685,663 A | 11/1997 | Sadri | |
| 5,954,353 A | 9/1999 | Kincaid et al. | |
| 6,007,080 A | 12/1999 | Kincaid et al. | |
| 6,206,392 B1 | 3/2001 | Siecinski et al. | |
| 6,533,301 B1 | 3/2003 | Catania | |
| 6,685,381 B1 | 2/2004 | Sugita et al. | |
| 6,968,607 B2 * | 11/2005 | Motsenbocker | 29/505 |

(Continued)

*Primary Examiner*—David P. Bryant
*Assistant Examiner*—Alexander P Taousakis
(74) *Attorney, Agent, or Firm*—MacMillian, Sobanski & Todd, LLC

(57) ABSTRACT

A stabilizer bar for an automotive vehicle includes a stabilizer bar, and a generally ring shaped first mechanical stop mounted onto and extending about an outer diameter of the stabilizer bar. The first mechanical stop is crimped in place onto the stabilizer bar such that the first mechanical stop is positioned within a groove formed within the outer diameter of the stabilizer bar as the first mechanical stop is crimped onto the stabilizer bar, whereby the first mechanical stop is retained within the groove to prevent movement of the mechanical stop along the stabilizer bar.

12 Claims, 6 Drawing Sheets

U.S. PATENT DOCUMENTS 7,044,458 B2 * 5/2006 Daily et al. .................. 267/149
2003/0111817 A1 6/2003 Fader et al.
2003/0127786 A1 7/2003 Daily et al.
2004/0075235 A1 4/2004 Cai et al.
2005/0077663 A1 * 4/2005 Owen et al. ................. 267/188

* cited by examiner

METHOD OF CRIMPING A RING SHAPED STOP WITHIN AN ANNULAR GROOVE OF A STABILIZER BAR

BACKGROUND

1. Field of the Invention

The present invention generally relates to a stabilizer bar having a stop mounted thereon.

2. Description of Related Technology

In an automotive vehicle, a stabilizer bar helps to keep the vehicle level, particularly when the vehicle is traveling through a curve. The ends of the stabilizer bar are connected to the right and left wheel assemblies of the vehicle. A pair of brackets, positioned between the ends of the stabilizer bar, secure the stabilizer bar to a structural component of the vehicle. Rubber bushings positioned between the stabilizer bar and the brackets provide dampening to the stabilizer bar relative to the bracket.

To keep the bushings positioned on the stabilizer bar, a stop is usually formed within, or mounted onto, the stabilizer bar. Sometimes the stops are provided as an annular rib, or ribs, extending around the stabilizer bar. This makes the stabilizer bar more difficult to manufacture and adds weight to the stabilizer bar. Alternatively, the bushings can be secured in position on the stabilizer bar by using a chemical bonding agent. This, again, adds cost and complexity to the manufacturing process.

As seen from the above, there is a need for an improved stabilizer bar assembly which provides a mechanical stop mounted onto the stabilizer bar that is easy to manufacture and low in cost.

A principle object of this invention is to provide a stabilizer bar assembly having a generally ring shaped mechanical stop mounted onto and extending about an outer diameter thereof, that is crimped in place onto the stabilizer bar.

SUMMARY

A stabilizer bar having features of the present invention includes a stabilizer bar with a generally ring shaped first mechanical stop mounted onto and extending about an outer diameter thereof. The first mechanical stop is crimped in place onto the stabilizer bar such that the first mechanical stop is positioned within a groove formed and/or by interference fit within the outer diameter of the stabilizer bar as the first mechanical stop is crimped onto the stabilizer bar. The first mechanical stop is retained within the groove and/or interference fit to prevent movement of the mechanical stop along the stabilizer bar.

In one aspect, the first mechanical stop has a first end and a second end, said first end being attached to said second end.

In another aspect, the generally ring shaped first mechanical stop includes an inner diameter having a plurality of radial inwardly extending teeth that engage the outer diameter of the stabilizer bar within the groove and/or interference area to further prevent relative movement of the first mechanical stop and the stabilizer bar.

In yet another aspect, the stabilizer bar includes a generally ring shaped second mechanical stop mounted onto and extending about the outer diameter of the stabilizer bar. The second mechanical stop is crimped in place onto the stabilizer bar, within the groove and/or interference area, adjacent the first mechanical stop.

In still another aspect, the stabilizer bar includes a generally ring shaped third mechanical stop mounted onto and extending about the outer diameter of the stabilizer bar. The third mechanical stop is crimped in place onto and extends over the outer diameters of the first and second mechanical stops to further retain the first and second mechanical stops within the groove.

In yet another aspect, the stabilizer bar includes a generally ring shaped second mechanical stop mounted onto and extending about the outer diameter of the stabilizer bar that is crimped in place onto an outer diameter of the first mechanical stop to further retain the first mechanical stop within the groove.

DESCRIPTION OF THE DRAWINGS

The above, as well as other advantages of the present invention, will become readily apparent to those skilled in the art from the following detailed description of the embodiments when considered in the light of the accompanying drawings in which.

DESCRIPTION OF THE EMBODIMENTS

Figure 1:
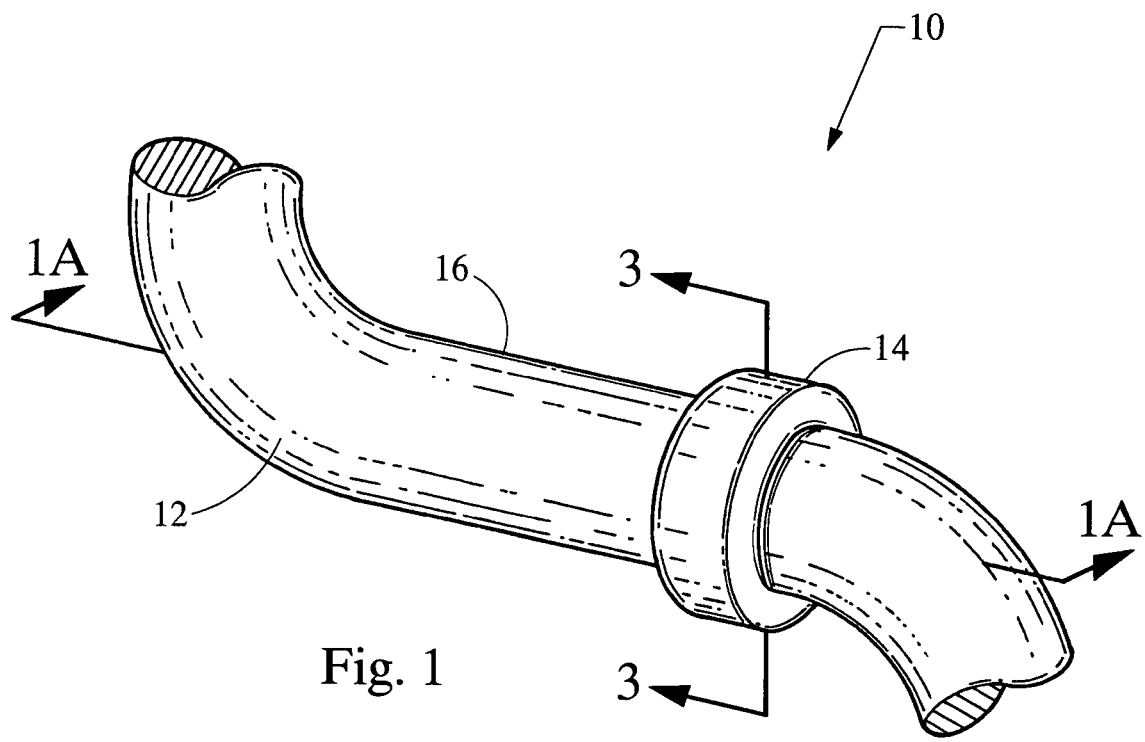
FIG. 1 is a perspective view of a stabilizer bar having features of the present invention.

Referring to FIG. 1, a stabilizer bar assembly incorporating features of the present invention is shown generally at 10. The stabilizer bar assembly 10 includes a stabilizer bar 12 and a first mechanical stop 14 mounted thereon.

Figure 1A:
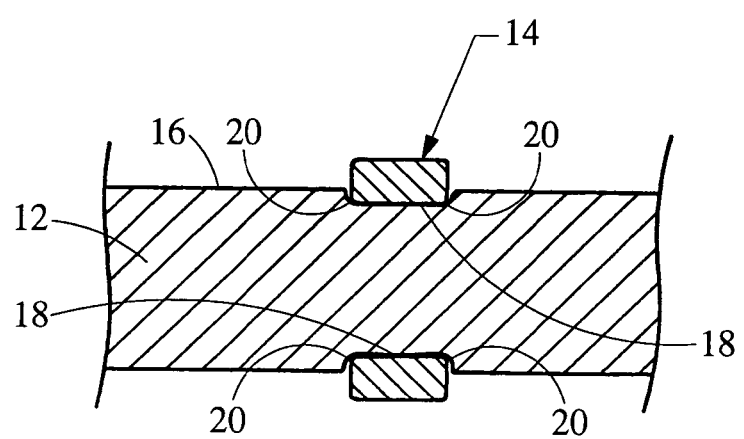
FIG. 1A is a sectional view taken along line 1a-1a of FIG. 1.
Figure 1B:
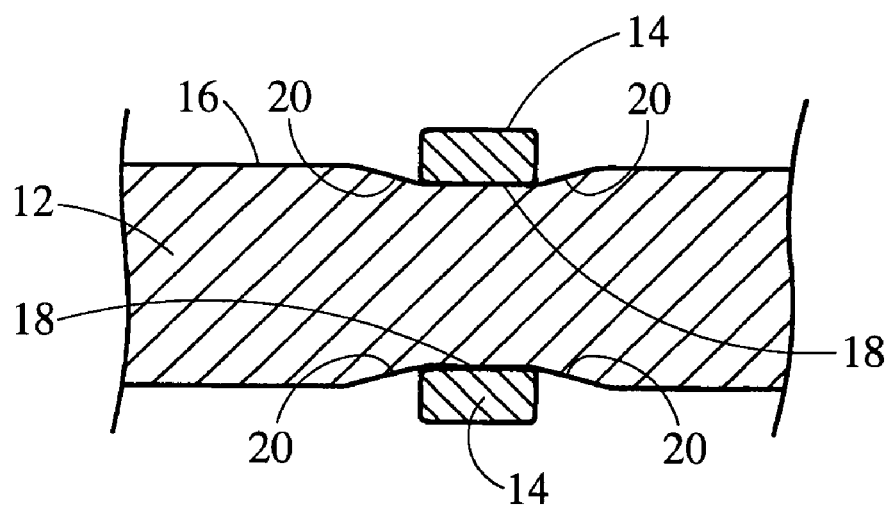
FIG. 1B is a sectional view similar to FIG. 1A wherein the groove has gradually tapered sides.

The first mechanical stop 14 is generally ring shaped and extends about an outer diameter 16 of the stabilizer bar 12. The first mechanical stop 14 is crimped in place onto the stabilizer bar 12 such that the first mechanical stop 14 is positioned within a groove 18 formed within the outer diameter 16 of the stabilizer bar 12. Referring to FIG. 1A, the groove 18 defines en edge 20 adjacent each side of the first mechanical stop 14. The edges 20 provide an additional positive stop to prevent movement of the first mechanical stop 14 along the stabilizer bar 12. The groove 18 can include relatively sharp edges 20, as shown in FIG. 1A, or can have more gradually tapered edges 20, as shown in FIG. 1B. While the depth of the groove 18 in FIGS. 1A and 1B is shown exaggerated for illustrative purposes, it is to be understood, that the groove 18 could be formed very shallow, wherein the groove 18 would not be readily visible to the naked eye.

Figure 1C:
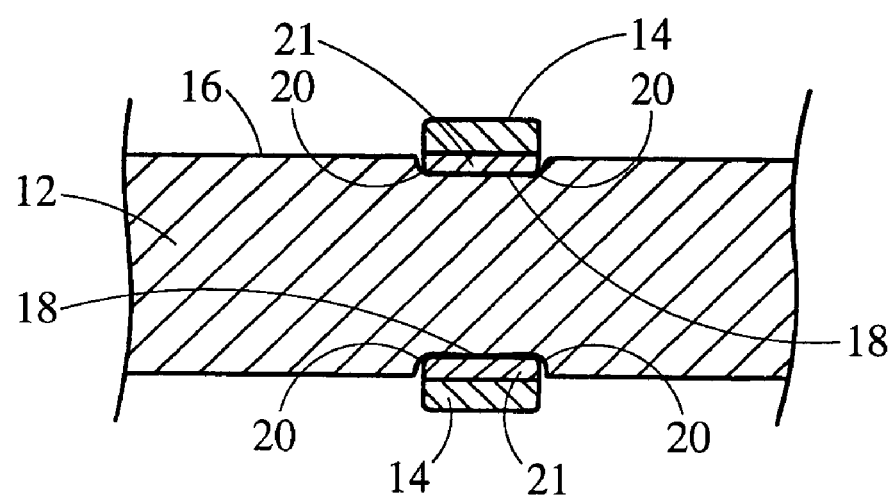
FIG. 1C is a sectional view similar to FIG. 1A wherein an intermediate material is positioned between the first mechanical stop and the stabilizer bar.

The stabilizer bar assembly 10 is formed by placing the first mechanical stop 14 onto the stabilizer bar 12, forming the annular groove 18 within the outer diameter 16 of the stabilizer bar 12, and crimping the first mechanical stop 14 onto the stabilizer bar 12 within the groove 18. In an alternative embodiment, as shown in FIG. 1C, an intermediate material 21 is placed between the first mechanical stop 14 and the stabilizer bar 12 prior to crimping the first mechanical stop 14. The intermediate material 21 can be utilized to fill in some of the void between an inner diameter 22 (shown in FIG. 2) of the first mechanical stop 14 and the outer diameter 16 of the stabilizer bar 12 prior to crimping. This means that when a standard size first mechanical stop 14 is being used on a smaller stabilizer bar 12, the first mechanical stop 14 will not have to be crimped down as much.

The inner diameter 22 of the first mechanical stop 14 is larger than the outer diameter 16 of the stabilizer bar 12 to allow the first mechanical stop 14 to fit over the outer diameter 16 of the stabilizer bar 12. Some stabilizer bars include flattened portions or paddles formed at the distal ends to allow the stabilizer bar 12 to be mounted within a vehicle. The inner diameter 22 of the first mechanical stop 14 is large enough to allow the paddles of the stabilizer bar 12 to fit therethrough. Alternatively, the shape of the first mechanical stop 14 can be oval to provide clearance for the paddles of the stabilizer bar 12. In this way, the mechanical stop 14 can be placed onto the stabilizer bar either before or after the paddles of the stabilizer bar have been formed.

Figure 2:
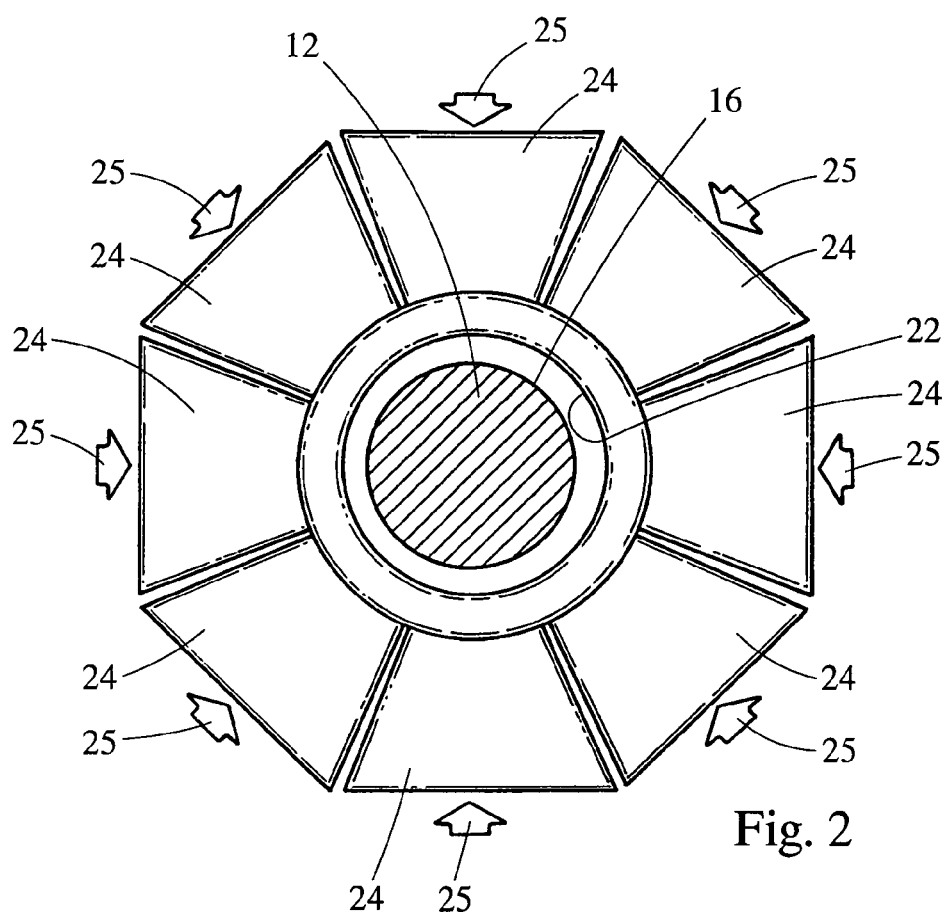
FIG. 2 illustrates how the mechanical stop is crimped onto the stabilizer bar.

Preferably, forming the annular groove 18 within the outer diameter 16 of the stabilizer bar 12 and crimping the first mechanical stop 14 are done simultaneously. Referring to FIG. 2, the crimping is performed by a plurality of crimping segments 24. The crimping segments 24 are spaced circumferentially about the first mechanical stop 14 and are forced radially inward, as shown by arrows 25, to plastically deform the first mechanical stop 14.

As shown, there are eight crimping segments 24. However, any appropriate number of crimping segments can be used, including as few as two crimping segments.

Figure 3:
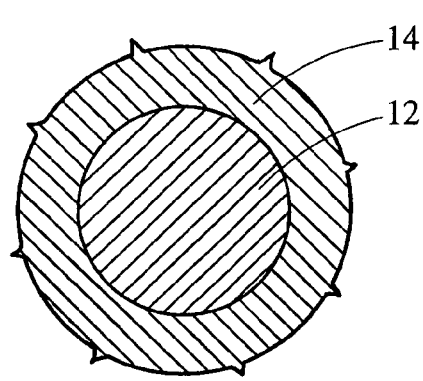
FIG. 3 is a sectional view taken along line 3-3 of FIG. 1.

The crimping segments 24 are forced radially inward until the first mechanical stop 14 has been plastically deformed and engages the outer diameter 16 of the stabilizer bar 12, as shown in FIG. 3. The crimping segments 24 continue to move radially inward until the force of the crimping segments 24 pushing on the first mechanical stop 14 causes a groove 18 to form within the outer diameter 16 of the stabilizer bar 12, as shown in FIG. 1A. The edges 20 defined on either side of the groove 18 to further prevent the first mechanical stop 14 from moving along the stabilizer bar 12.

Figure 4:
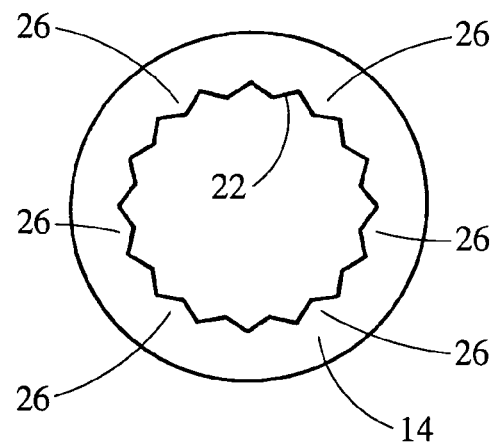
FIG. 4 is a top view of a mechanical stop that includes radially inward extending teeth.

Referring to FIG. 4, the inner diameter 22 of the first mechanical stop 14 may include a plurality of radial inwardly extending teeth 26. The teeth 26 formed on the inner diameter 22 of the first mechanical stop 14 engage the outer diameter 16 of said stabilizer bar 12 within the groove 18 to further prevent relative movement of the first mechanical stop 14 and the stabilizer bar 12.

Figure 5:
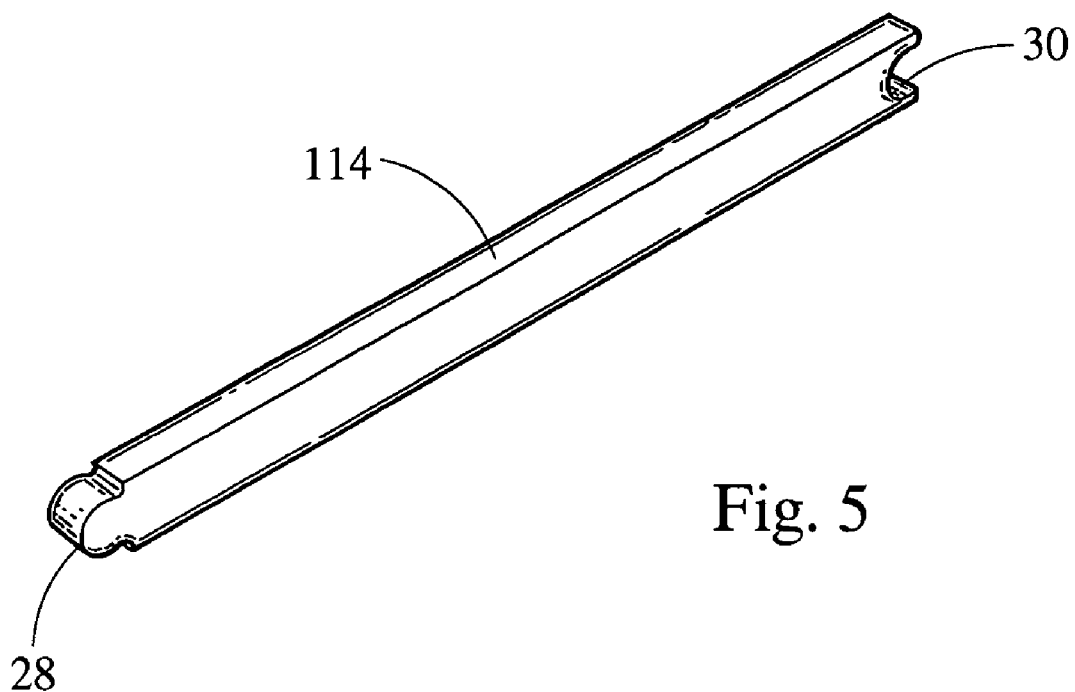
FIG. 5 is a perspective view of a mechanical stop having a first end and a second end.
Figure 6:
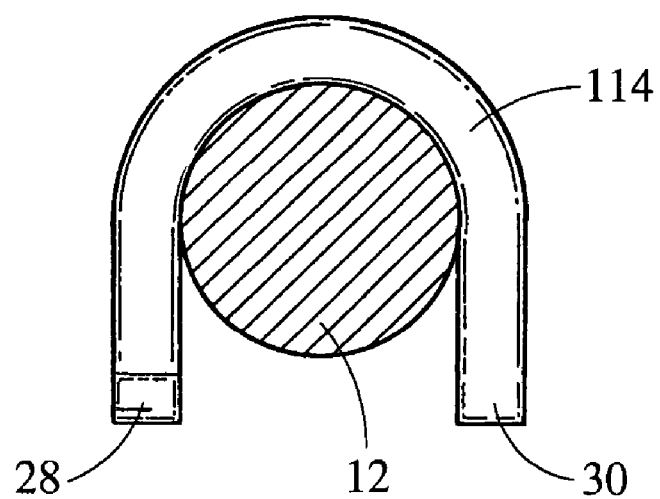
FIG. 6 is a perspective view of the mechanical stop shown in FIG. 5 after being formed to fit around a stabilizer bar.
Figure 7:
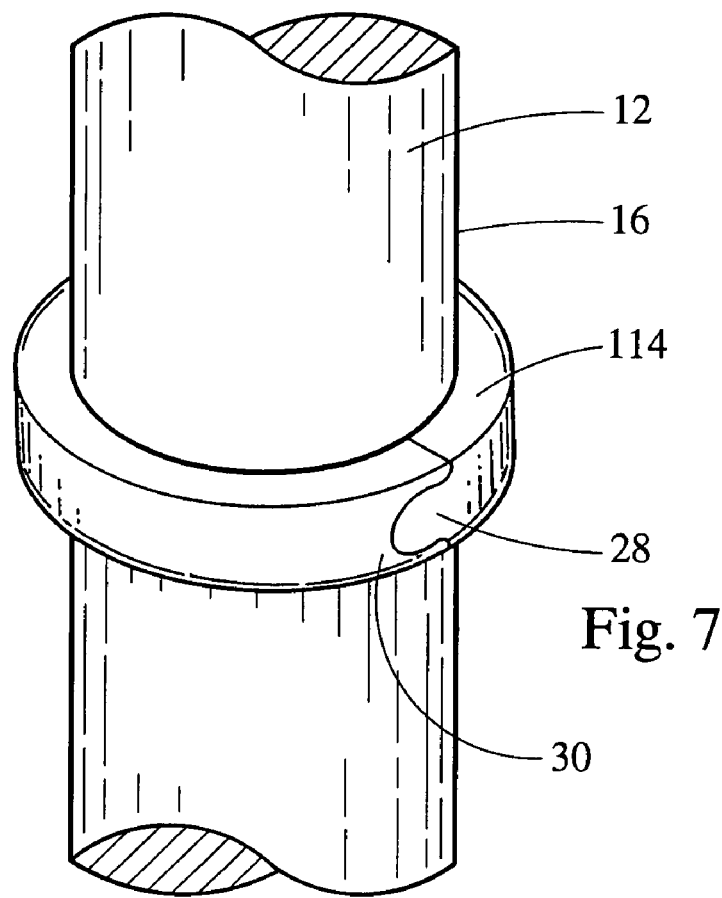
FIG. 7 is a perspective view of the mechanical stop shown in FIG. 5 after being formed around the stabilizer bar.

Referring to FIGS. 5, 6, and 7, a first mechanical stop 114 is shown that is formed from a single piece that has a first end 28 and a second end 30. The first end 28 is attached to the second end 30 to form a generally ring shaped first mechanical stop 114.

The first mechanical stop 114 having first and second ends 28, 30 can be attached to the stabilizer bar 12 in one of two ways. First, the first and second ends 28, 30 of the first mechanical stop 114 can be attached, thereby forming a generally ring shaped first mechanical stop 114. As shown in FIG. 5, the first and second ends 28, 30 are male/female counterparts to a tongue and groove type engagement that attaches the first and second ends 28, 30 to one another. Other known methods of attachment could also be used to attach the first and second ends 28, 30 to one another.

The ring shaped first mechanical stop 114 is then placed onto the stabilizer bar 12 and crimped as discussed above. Alternatively, the single piece can be wrapped around the stabilizer bar 12, as shown in FIG. 6, and then the first and second ends 28, 30 are attached. The alternative allows the first mechanical stop 114 to be designed with tighter tolerances because the stabilizer bar 12, and more particularly, the paddles of the stabilizer bar 12, do not have to be inserted through the inner diameter of the first mechanical stop 114. This means that less crimping is required to plastically deform the first mechanical stop 114.

Figure 8:
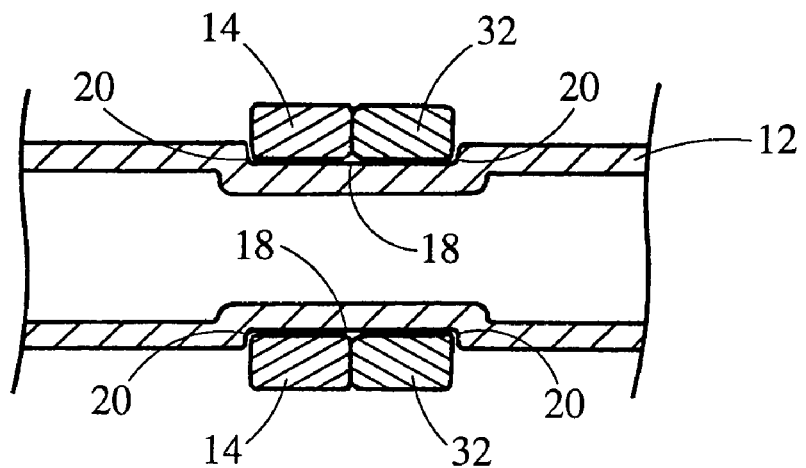
FIG. 8 is a side sectional view of an embodiment including two mechanical stops mounted adjacent one another.

Referring to FIG. 8, an embodiment of the present invention is shown wherein a second mechanical stop 32 is mounted onto the stabilizer bar 12 adjacent the first mechanical stop 14. The second mechanical stop 32 is mounted onto the stabilizer bar 12 in substantially the same way as the first mechanical stop 14. The second mechanical stop 32 can be a solid ring, or a split ring having first and second ends, similar to the first mechanical stop 14, and may include teeth extending from an inner diameter thereof. The second mechanical stop 32 adds stability to the stabilizer bar assembly 10 by increasing the amount of frictional surface area of the outer diameter 16 of the stabilizer bar 12 that is being engaged by the first and second mechanical stops 14, 32. The first and second mechanical stops 14, 32 of this embodiment would withstand more force than the first mechanical stop 14 alone.

Figure 9:
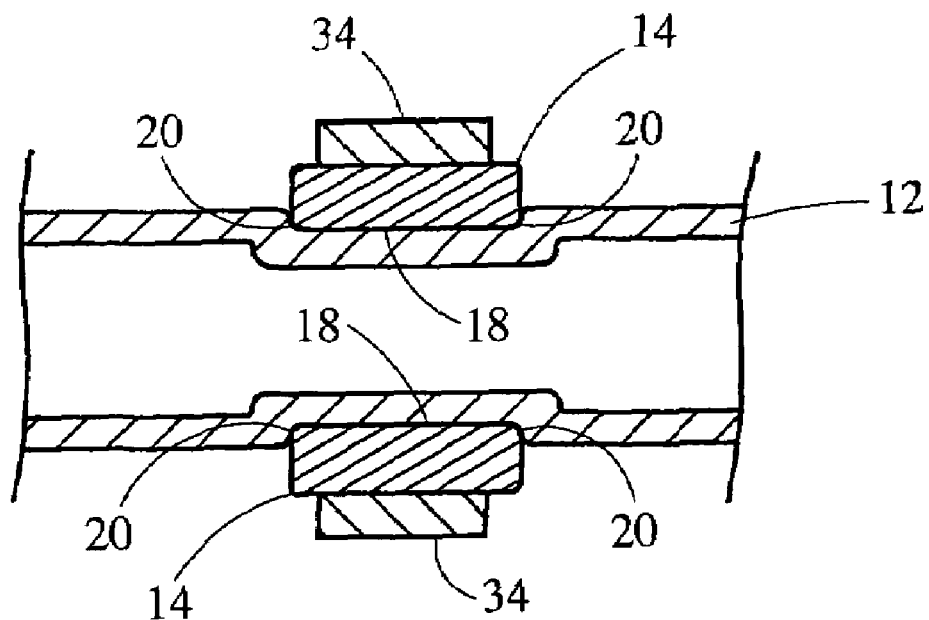
FIG. 9 is a side sectional view of an embodiment including a second mechanical stop mounted over the first mechanical stop.

Referring to FIG. 9, an embodiment of the present invention is shown wherein a second mechanical stop 34 is mounted onto the stabilizer bar 12 over the first mechanical stop 14. The second mechanical stop 34 is mounted onto the first mechanical stop 14 in substantially the same way as the first mechanical stop 14 is mounted onto the stabilizer bar 12. Alternatively, the second mechanical stop 34 could be placed over the first mechanical stop 14 prior to crimping the first mechanical stop 14, wherein both the first and second mechanical stops 14, 34 are crimped onto the stabilizer bar 12 simultaneously. The second mechanical stop 34 can be a solid ring, or a split ring having first and second ends, similar to the first mechanical stop 14, and may include teeth extending from an inner diameter thereof. The second mechanical stop 34 adds stability to the stabilizer bar assembly 10 by increasing the amount of residual compression on the first mechanical stop 14. This keeps the first mechanical stop 14 solidly crimped onto the stabilizer bar. The first and second mechanical stops 14, 34 of this embodiment would withstand more force than the first mechanical stop 14 alone.

Figure 10:
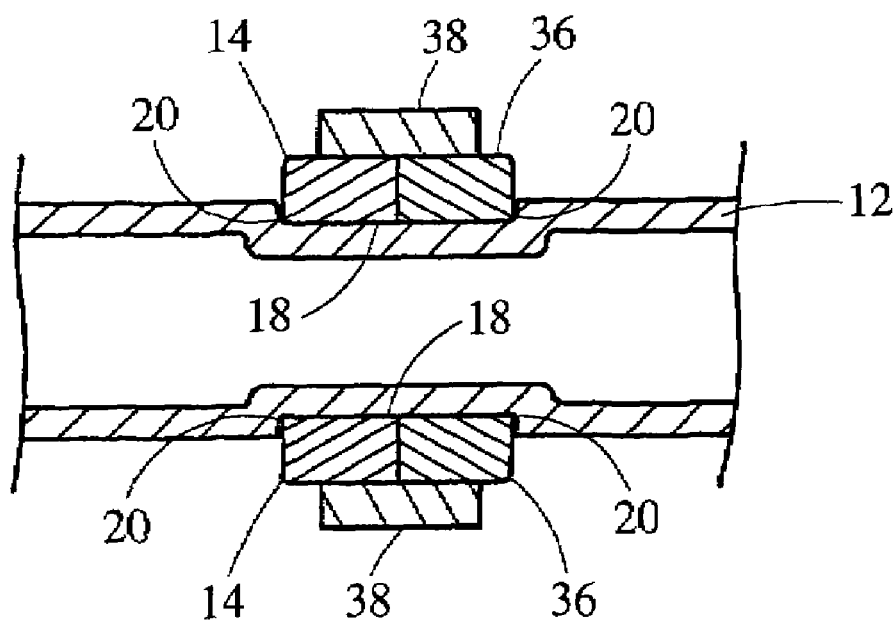
FIG. 10 is side sectional view of an embodiment including two mechanical stops mounted adjacent one another with a third mechanical stop mounted over the first two mechanical stops.

Referring to FIG. 10, a hybrid of the embodiments shown in FIGS. 8 and 9 is shown. A second mechanical stop 36 is mounted onto the stabilizer bar 12 adjacent the first mechanical stop 14 and a third mechanical stop 38 is mounted onto the stabilizer bar 12 over the first and second mechanical stops 14, 36. The second and third mechanical stops 36, 38 are mounted onto the stabilizer bar 12 in substantially the same way as the first mechanical stop 14. The first and second mechanical stops 14, 36 can be solid rings, or split rings having first and second ends, similar to the first mechanical stop 14, and may include teeth extending from an inner diameter thereof. The hybrid embodiment shown in FIG. 10 adds the advantages of each of the embodiments shown in FIGS. 8 and 9. The second mechanical stop 36 adds stability to the stabilizer bar assembly 10 by increasing the amount of frictional surface area of the outer diameter 16 of the stabilizer bar 12 that is being engaged by the first and second mechanical stops 14, 36. The third mechanical stop 38 adds stability to the stabilizer bar assembly 10 by increasing the amount of residual compression on the first and second mechanical stops 14, 36. This keeps the first and second mechanical stops 14, 36 solidly crimped onto the stabilizer bar 12.

The ring shaped mechanical stops 14, 32, 34, 36, 38 of the present invention advantageously allow the same size and shape mechanical stop to be mass produced and used on different sized and shaped stabilizer bars. The mechanical stops 14, 32, 34, 36, 38 and the method of mounting the mechanical stops 14, 32, 34, 36, 38 onto the stabilizer bar 12 can be used on a solid stabilizer bar or a hollow stabilizer bar.

In accordance with the provisions of the patent statutes, the features of the present application have been described in various specific embodiments. However, it should be noted that the features of the present application can be practiced otherwise than as specifically illustrated and described herein.

What is claimed is:

1. A method of forming a stabilizer bar having a mechanical stop mounted thereon comprising:
   providing a stabilizer bar having a length and an outer diameter;
   providing a single piece generally ring shaped first mechanical stop having an inner diameter that is larger than the outer diameter of the stabilizer bar;
   placing the first mechanical stop onto the stabilizer bar;
   forming an annular groove within the outer diameter of the stabilizer bar;
   crimping the first mechanical stop to plastically deform the first mechanical stop until the inner diameter of the first mechanical stop engages the outer diameter of the stabilizer bar within the groove.

2. The method of claim 1 wherein providing a single piece generally ring shaped first mechanical stop having an inner diameter that is larger than the outer diameter of the stabilizer bar, includes providing a single piece generally ring shaped first mechanical stop having an inner diameter that is larger than the outer diameter of the stabilizer bar and is generally oval shaped.

3. The method of claim 1 wherein providing a generally ring shaped first mechanical stop having an inner diameter that is larger than the outer diameter of the stabilizer bar, includes providing a generally ring shaped first mechanical stop having an inner diameter that is larger that the outer diameter of the stabilizer bar wherein the inner diameter of the first mechanical stop includes a plurality of radially inward extending teeth.

4. The method of claim 1 wherein forming an annular groove within the outer diameter of the stabilizer bar and crimping the first mechanical stop to plastically deform the first mechanical stop until the inner diameter of the first mechanical stop engages the outer diameter of the stabilizer bar within the groove are done simultaneously.

5. The method of claim 4 wherein forming an annular groove within the outer diameter of the stabilizer bar and crimping the first mechanical stop to plastically deform the first mechanical stop until the inner diameter of the first mechanical stop engages the outer diameter of the stabilizer bar within the groove includes providing a plurality of crimping segments spaced circumferentially about the first mechanical stop and forcing the crimping segments radially inward to plastically deform the first mechanical stop.

6. The method of claim 5 wherein providing a plurality of crimping segments includes providing a plurality of at least eight crimping segments.

7. The method of claim 5 wherein forcing the crimping segments radially inward to plastically deform the first mechanical stop includes forcing the crimping segments radially inward until the first mechanical stop is crimped onto the stabilizer bar, wherein the force of the crimping segments on the first mechanical stop plastically deforms the outer diameter of the stabilizer bar, thereby forming the groove therein.

8. The method of claim 7 further including: providing a generally ring shaped second mechanical stop having an inner diameter that is larger than the outer diameter of the stabilizer bar; placing the second mechanical stop onto the stabilizer bar, adjacent the first mechanical stop, by extending the stabilizer bar through the inner diameter of the second mechanical stop; providing a plurality of crimping segments spaced circumferentially about the second mechanical stop and forcing the crimping segments radially inward until the second mechanical stop is crimped onto the stabilizer bar, wherein the force of the crimping segments on the second mechanical stop plastically deforms the outer diameter of the stabilizer bar, thereby enlarging the groove formed therein.

9. The method of claim 8 further including: providing a generally ring shaped third mechanical stop having an inner diameter that is larger than an outer diameter of the first and second mechanical stops; placing the third mechanical stop onto the stabilizer bar, over the first and second mechanical stops, by extending the stabilizer bar through the inner diameter of the third mechanical stop; providing a plurality of crimping segments spaced circumferentially about the third mechanical stop and forcing the crimping segments radially inward until the third mechanical stop is crimped onto the first and second mechanical stops, thereby further securing the first and second mechanical stops onto the stabilizer bar.

10. The method of claim 7 further including: providing a generally ring shaped second mechanical stop having an inner diameter that is larger than an outer diameter of the first mechanical stop; placing the second mechanical stop onto the stabilizer bar, over the first mechanical stop, by extending the stabilizer bar through the inner diameter of the second mechanical stop; providing a plurality of crimping segments spaced circumferentially about the second mechanical stop and forcing the crimping segments radially inward until the second mechanical stop is crimped onto the first mechanical stop, thereby further securing the first mechanical stop onto the stabilizer bar.

11. The method of claim 7 further including: providing a generally ring shaped second mechanical stop having an inner diameter that is larger than an outer diameter of the first mechanical stop; placing the second mechanical stop onto the stabilizer bar, over the first mechanical stop, by extending the stabilizer bar through the inner diameter of the second mechanical stop prior to crimping the first mechanical stop; providing a plurality of crimping segments spaced circumferentially about the second mechanical stop and forcing the crimping segments radially inward until the first mechanical stop and the second mechanical stop are crimped onto the stabilizer bar.

12. The method of claim 1 further including placing an intermediate material between the first mechanical stop and the stabilizer bar before crimping the first mechanical stop onto the stabilizer bar.

* * * * *